Feb. 23, 1926. 1,573,947
W. L. SUCHA
EMERGENCY BRAKE
Filed Jan. 19, 1925 2 Sheets-Sheet 2
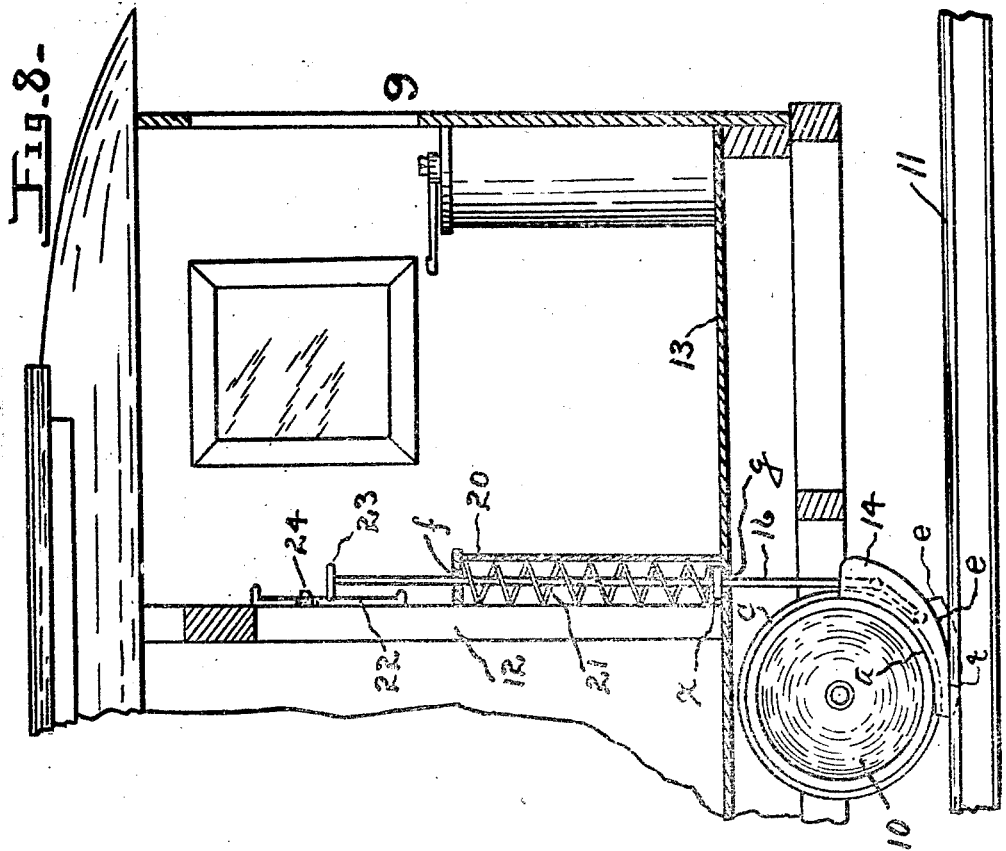
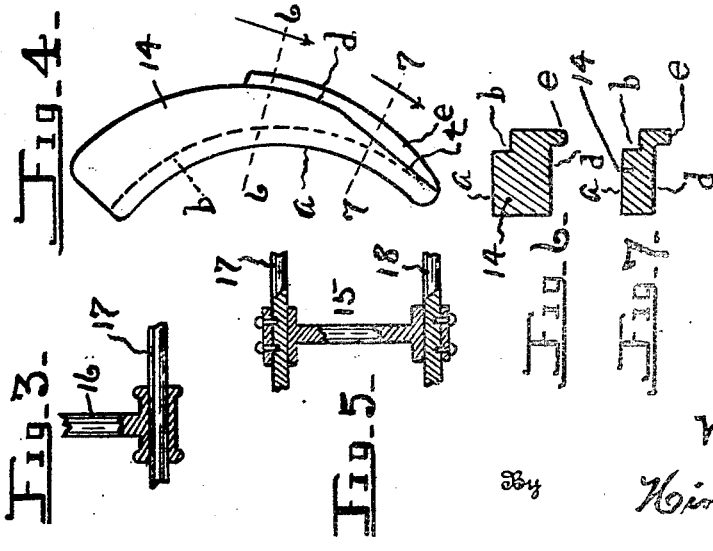
Inventor
W. L. Sucha,
By Hiram A. Sturges
Attorney Patented Feb. 23, 1926.

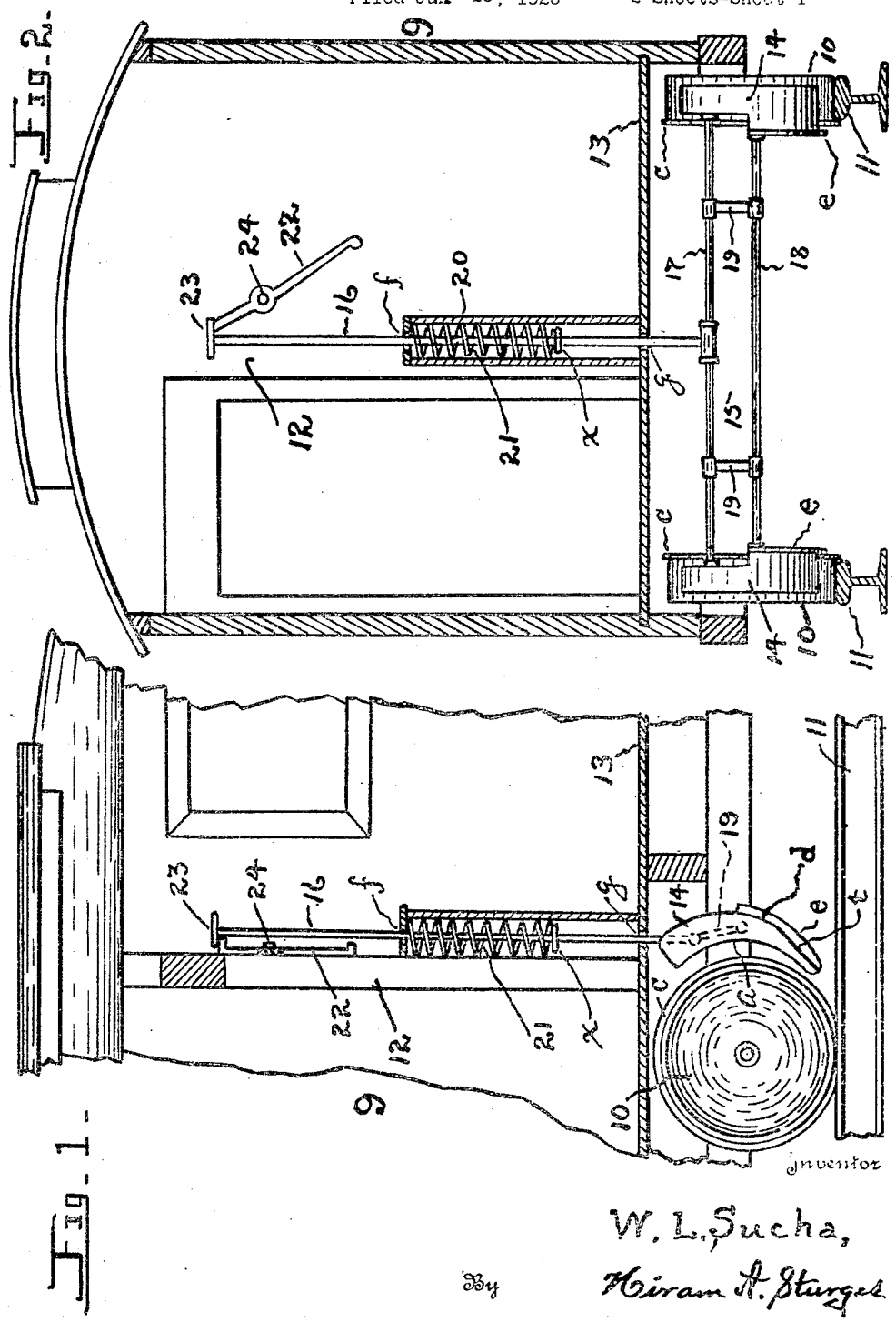

1,573,947

UNITED STATES PATENT OFFICE.

WILLIAM LOUIS SUCHA, OF OMAHA, NEBRASKA.

EMERGENCY BRAKE.

Application filed January 19, 1925. Serial No. 3,326.

*To all whom it may concern:*

Be it known that I, WILLIAM L. SUCHA, a citizen of the United States, residing at Omaha, in the county of Douglas and State of Nebraska, have invented certain new and useful Improvements in Emergency Brakes, of which the following is a specification.

This invention relates to an emergency brake for motor vehicles, street cars or other carriers, and has for its object, broadly, to provide a brake for engaging a track and the wheels moving thereon for causing a stop-movement of the car by frictional engagement of the brakes with the track, the construction to be operative for lifting the car by its momentum, and supporting a part of its weight upon the brakes, the device being particularly of advantage upon electric cars when moving downwardly upon inclines and depending upon the trolley and upon air brakes for a stop movement.

The invention consists of the novel and useful construction, combination and arrangement of parts as described herein and claimed, and as illustrated in the accompanying drawings, it being understood that changes may be made in form, size, proportions and minor details, said changes being within the scope of the invention as claimed.

In the drawings, Fig. 1 is a broken away side view of a car partly in section, showing the brake in its normal, elevated position. Fig 2 is an end view of the car showing parts thereof in section, the brake being supported in its elevated position. Fig. 3 is a detail showing the pivotal mounting of a control-rod upon a part of the frame for the brakes. Fig. 4 is a side view of a brake-shoe. Fig. 5 is a detail showing a rigid connection for the upper and lower link of a frame. Fig. 6 is a transverse section through a brake-shoe on line 6—6 of Fig. 4. Fig. 7 is a sectional view on line 7—7 of Fig. 4. Fig. 8 is a view partly in section showing an end portion of the car, the brake being in operative position in engagement of the wheels and track.

Referring now to the drawing for a more particular description, the invention is shown and described in connection with a part of a car 9, designated elsewhere and claimed as a carrier, the wheels 10 therefor and a track 11 designated elsewhere and claimed as a support, a partition for the car or carrier being indicated at 12, and a floor therefor being indicated at 13.

The emergency brake consists of concavoconvex wedge-members or shoes 14, used in pairs and normally disposed above the track forwardly of and adjacent to the wheels, said shoes being secured to the ends of a frame 15, and the frame being supported in such a manner that it may be moved downwardly to permit the shoes to be interposed between the support or track and the wheels to thereby cause the shoes to be pressed frictionally against the support or track to stop the movement of the car, a control-bar 16 being employed for supporting the frame and shoes.

Each shoe preferably has a concave surface $a$ for engaging the wheel, and a recess $b$ for receiving the usual flange $c$ at the inner side of a wheel 10, and is provided with a convexed surface $d$ having a rectilinear part $t$ for engaging the top of the ball of a rail, and a flange $e$ for engaging the inner side of the ball of said rail. Any suitable frame may be provided for connecting the shoes, and I have shown an upper horizontal link 17 having a pivotal connection with the control bar and a lower link 18 disposed parallel with the link 17, said links being secured, at their ends, to the shoes 14, and being rigidly connected by cross-plates or bars 19.

Numeral 20 indicates a box or guidemember for the control rod 16 and adapted to contain a spring 21, and at 22 is indicated a latch adapted to engage a catch or cap 23 which is provided for the rod 16, said latch preferably being formed as a rock-lever, and having a pivotal mounting 24 upon the partition 12.

It will be seen, according to the description, that a rocking movement of the frame 19 will cause corresponding movements of the shoes 14, the frame being under control of the rod 16. The frame 19 is normally pressed downwardly by the operation of the spring 21, aided by gravity, said spring being compressed between the collar $x$ of the rod and top of the box 20; and in operation, if a car is moving forwardly, the rod may be released from the lever or latch 22 by manually causing a swinging movement of the latter, the result being that the downward movement of the shoes and frame will dispose the lower ends of the shoes in engagement with the balls of the track rails, said shoes being immediately engaged by the wheels, said wheels moving into the shoes and being supported thereby as clearly shown in Fig. 8 of the drawings.

Since the surfaces $a$ and $d$ are non-concentric, one end of the car will be elevated from the track, and the shoes when thus interposed will, by weight of the car, be pressed against the track rails, and on account of the action of friction of the shoes moving upon the rails, the car will presently cease its forward movement. Each shoe has a flat surface $t$ for engaging a rail and operating to relieve stresses on the rod 16.

It will be noted that the shoes will not become disengaged from the rails while supporting the weight of the car for the reason that their flanges $e$ are disposed at the inner sides of the rails; also the wheels will not become disengaged from the shoes since their flanges $c$ engage in recesses $d$ at the inner sides of the shoes.

Also the mounting of the control rod 16 which traverses suitable apertures $f$ and $g$ provided, respectively, for the top of the guide member or box and in the floor 13 will prevent any movement of the frame transversely of the car, and therefore the shoes will be maintained with their flanges $e$ disposed inwardly of the balls of the track rails, and at any time when the control rod is released, engagement of the convexed surfaces $d$ of the shoes with the balls of the track rails will be practical and certain.

It is well known that accidents occur to electrically operated cars when moving downwardly upon inclines. The trolley may become disengaged from the trolley wire at a time when the air brakes are inoperative, and in such instances the herein described emergency brake may be used to advantage. The device as described consists of few and simple parts, may be operated conveniently, may be practically and economically manufactured, and may be applied to a car to occupy a very limited space.

It is considered that the springs 21 may be dispensed with if desired for the reason that the frame 15 and shoes 14 will move downwardly by action of gravity. While a street car and track rails have been shown in the drawings the herein described brake may be applied to vehicles and carriers generally, and when used upon any vehicle of ordinary construction, if the shoes are moved downwardly into engagement with the ground or similar support, it is obvious that such operation would cause the shoes to be disposed below the wheels and to be pressed into the ground or against said support, and on account of this frictional engagement caused by a forward movement of the vehicle, carrier, or car said forward movement would terminate.

In the use of the device upon electrically operated cars, it is obvious that the wheels may be readily removed from the shoes by causing a rearward movement of the car after the trolley has been adjusted and is again in engagement with the trolley wire.

I claim as my invention,—

In an emergency brake for a carrier including a support and having wheels for engaging track rails, a pair of shoes each being provided with a convexed wall having a rectilinear part and a concaved wall non-concentric with said convexed wall, a horizontal link rigidly connected with said shoes, an upright control-bar traversing said support and pivotally connected with said link and being movable to permit the rectilinear parts of the shoes to engage the track rails, a latch normally engaging the control bar for maintaining the shoes in disengaged relation with the wheels and track rails, and resilient means on the control bar tending to move said bar and link for moving the shoes into engagement with the track rails, said control-bar having a projection for engaging said support when the bar is disengaged from the latch and while the rectilinear parts of the shoes engage the track rails.

In testimony whereof, I have affixed my signature.

WILLIAM LOUIS SUCHA.